US012621592B2

(12) United States Patent
Zhang

(10) Patent No.: US 12,621,592 B2
(45) Date of Patent: May 5, 2026

(54) TIME SYNCHRONIZATION METHOD FOR PASSIVE OPTICAL NETWORK, AND ELECTRONIC DEVICE AND STORAGE MEDIUM

(71) Applicant: ZTE CORPORATION, Shenzhen (CN)

(72) Inventor: Weiliang Zhang, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 239 days.

(21) Appl. No.: 18/550,763

(22) PCT Filed: Dec. 7, 2021

(86) PCT No.: PCT/CN2021/136142
§ 371 (c)(1),
(2) Date: Sep. 15, 2023

(87) PCT Pub. No.: WO2022/193744
PCT Pub. Date: Sep. 22, 2022

(65) Prior Publication Data
US 2024/0163592 A1      May 16, 2024

(30) Foreign Application Priority Data

Mar. 17, 2021    (CN) ......................... 202110284376.X

(51) Int. Cl.
*H04Q 11/00*          (2006.01)
*H04J 3/06*            (2006.01)
(52) U.S. Cl.
CPC ........ *H04Q 11/0067* (2013.01); *H04J 3/0682* (2013.01); *H04Q 2011/0045* (2013.01); *H04Q 2011/0064* (2013.01)

(58) Field of Classification Search
CPC ....... H04Q 11/0067; H04Q 2011/0045; H04Q 2011/0064; H04J 3/0682
See application file for complete search history.

(56) References Cited

U.S. PATENT DOCUMENTS

| | | | | |
|---|---|---|---|---|
| 10,020,889 B2 * | 7/2018 | Wu | ........................ | H04J 3/0682 |
| 10,727,939 B2 * | 7/2020 | Yin | .................... | H04B 10/0795 |

(Continued)

FOREIGN PATENT DOCUMENTS

| | | | |
|---|---|---|---|
| CN | 106301642 A | 1/2017 |
| CN | 108242953 A | 7/2018 |

(Continued)

OTHER PUBLICATIONS

European Patent Office. Extended European Search Report for EP Application No. 21931318.6, mailed Aug. 6, 2024, pp. 1-6.

(Continued)

*Primary Examiner* — Kenneth N Vanderpuye
*Assistant Examiner* — Asif Shameem
(74) *Attorney, Agent, or Firm* — Vivacqua Crane, PLLC

(57) ABSTRACT

A time synchronization method for a passive optical network, and an electronic device and a storage medium are disclosed. The method may include acquiring a first response time from a first optical network unit (ONU); performing a ranging calculation to the first ONU to acquire a first equalization time delay; generating an equalization delay configuration message according to the first response time and the first equalization delay; and sending the equalization delay configuration message to a second ONU to configure a second equalization delay for the second ONU; where the first ONU and the second ONU access the same branch optical fiber.

19 Claims, 7 Drawing Sheets

(56)                    References Cited

U.S. PATENT DOCUMENTS

| | | | |
|---|---|---|---|
| 2009/0010642 A1* | 1/2009 | Sui ..................... | H04B 10/0793 |
| | | | 398/9 |
| 2010/0183316 A1* | 7/2010 | Gordon .............. | H04Q 11/0067 |
| | | | 398/149 |
| 2011/0243554 A1 | 10/2011 | Niibe et al. | |
| 2016/0285555 A1 | 9/2016 | Wu et al. | |
| 2019/0356389 A1 | 11/2019 | Weeber et al. | |
| 2019/0386743 A1 | 12/2019 | Yin et al. | |

FOREIGN PATENT DOCUMENTS

| | | | |
|---|---|---|---|
| CN | 109104646 A | 12/2018 | |
| CN | 110226299 A | 9/2019 | |
| CN | 110505010 A | 11/2019 | |
| WO | 2018170836 A1 | 9/2018 | |

OTHER PUBLICATIONS

International Searching Authority. International Search Report and Written Opinion for PCT Application No. PCT/CN2021/136142 and English translation, mailed Mar. 9, 2022, pp. 1-10.

European Patent Office. Communication pursuant to Article 94(3) EPC for EP Application No. 21931318.6, mailed Nov. 25, 2025, pp. 1-7.

International Telecommunication Union. "Omci for ONU Response Time," ITU Working Document LF03, Study Period 2005-2008, Study Group 15, Feb. 2007, pp. 1-3.

Mexican Institute of Industrial Property. First Office Action for MX Application No. MX/a/2023/010832 and English translation, mailed Jan. 28, 2026, pp. 1-10.

* cited by examiner

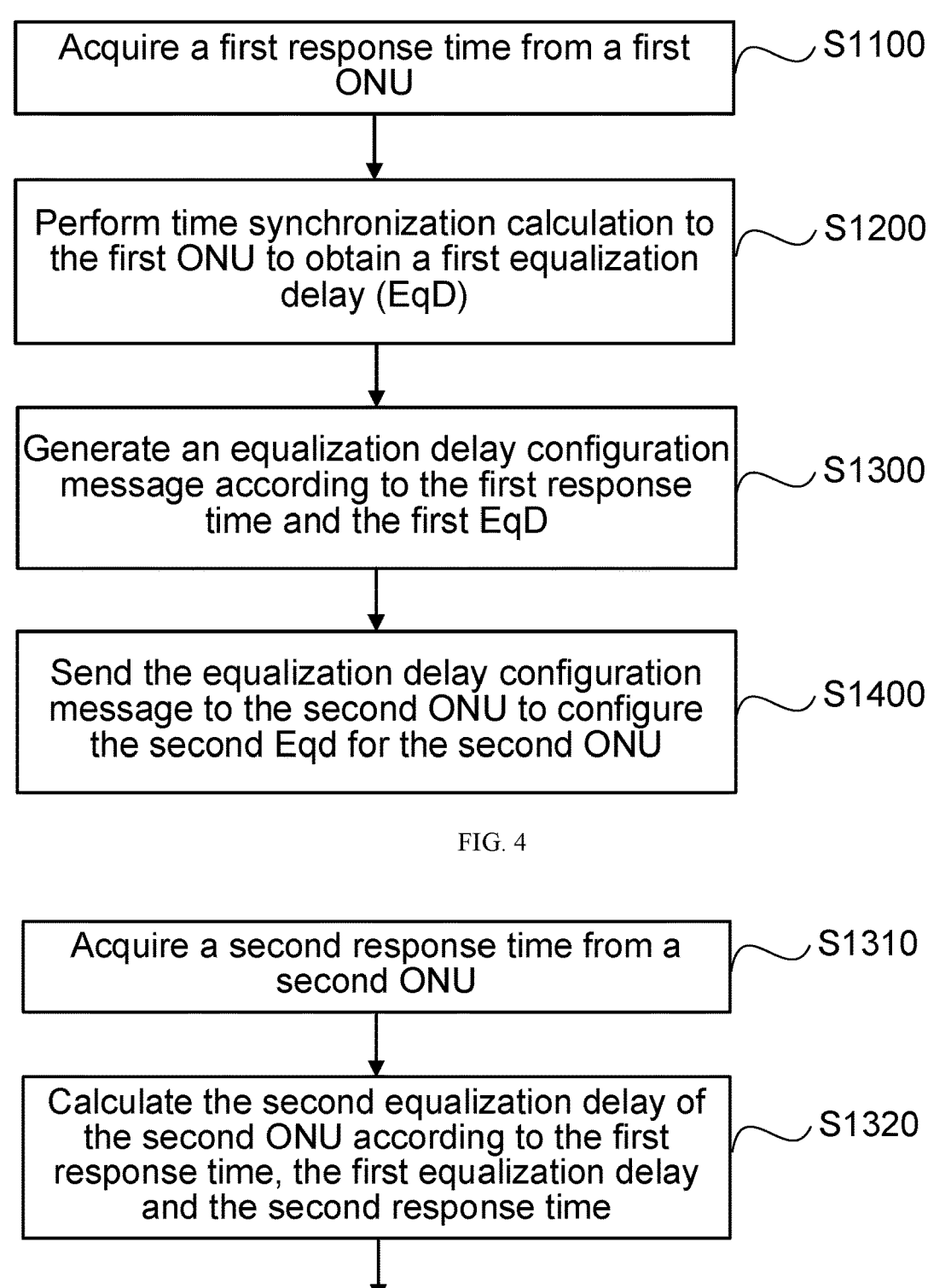

Acquire a first response time from a first ONU    S1100

Perform time synchronization calculation to the first ONU to obtain a first equalization delay (EqD)    S1200

Generate an equalization delay configuration message according to the first response time and the first EqD    S1300

Send the equalization delay configuration message to the second ONU to configure the second Eqd for the second ONU    S1400

FIG. 4

Acquire a second response time from a second ONU    S1310

Calculate the second equalization delay of the second ONU according to the first response time, the first equalization delay and the second response time    S1320

Generate an equalization delay configuration message according to the second equalization delay    S1330

FIG. 5

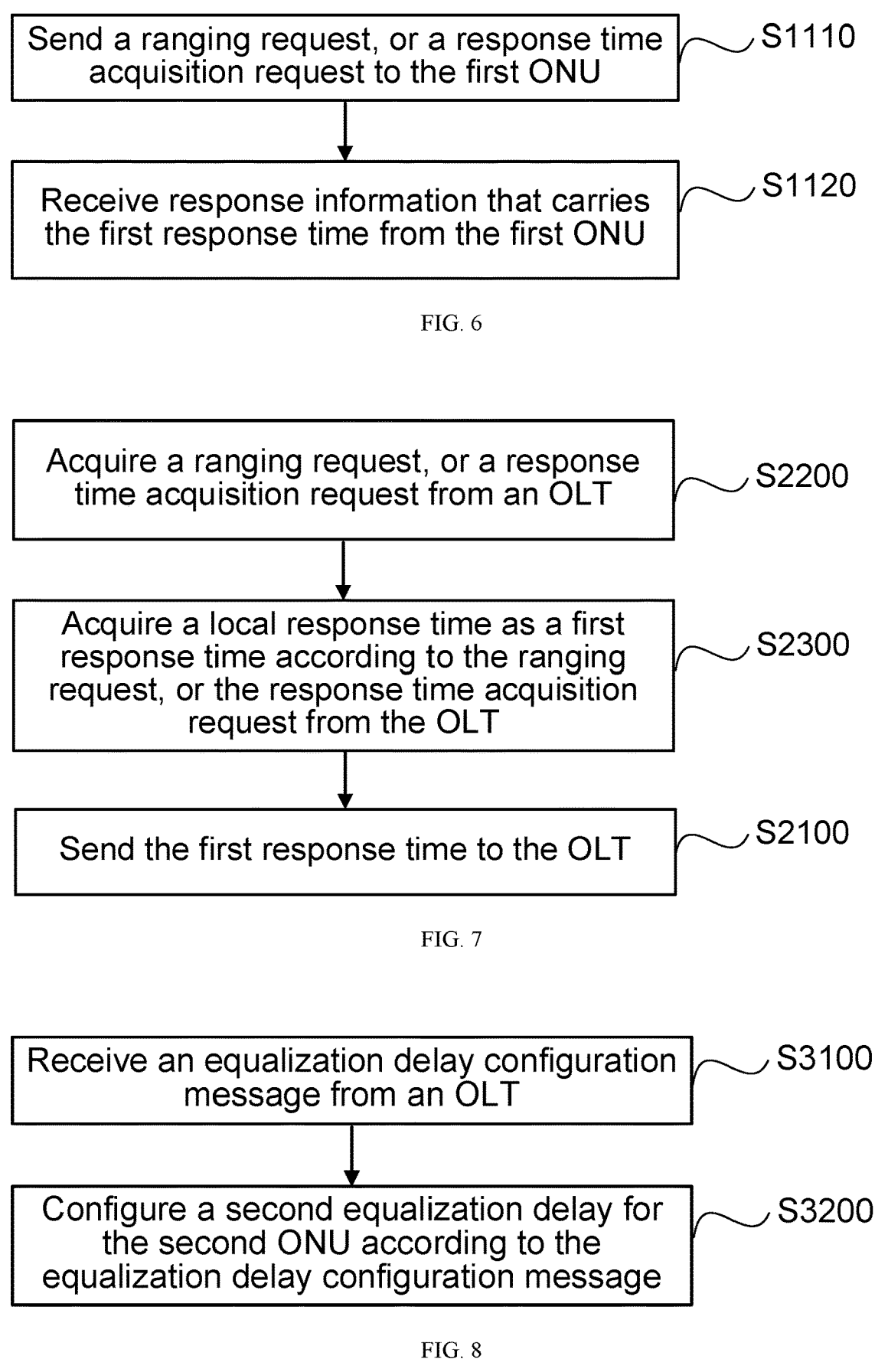

Send a ranging request, or a response time acquisition request to the first ONU    S1110

Receive response information that carries the first response time from the first ONU    S1120

FIG. 6

Acquire a ranging request, or a response time acquisition request from an OLT    S2200

Acquire a local response time as a first response time according to the ranging request, or the response time acquisition request from the OLT    S2300

Send the first response time to the OLT    S2100

FIG. 7

Receive an equalization delay configuration message from an OLT    S3100

Configure a second equalization delay for the second ONU according to the equalization delay configuration message    S3200

FIG. 8

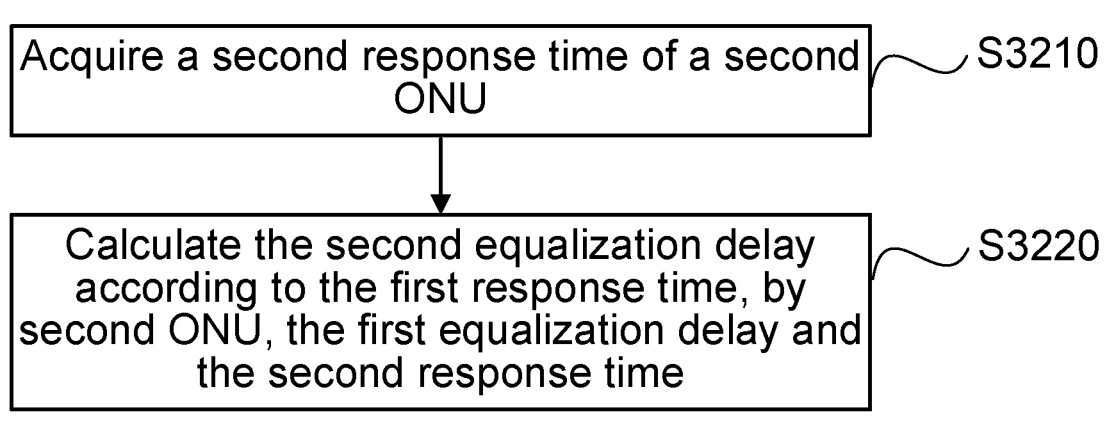

Acquire a second response time of a second ONU ⟩~⟩ S3210

Calculate the second equalization delay according to the first response time, by second ONU, the first equalization delay and the second response time ⟩~⟩ S3220

FIG. 9

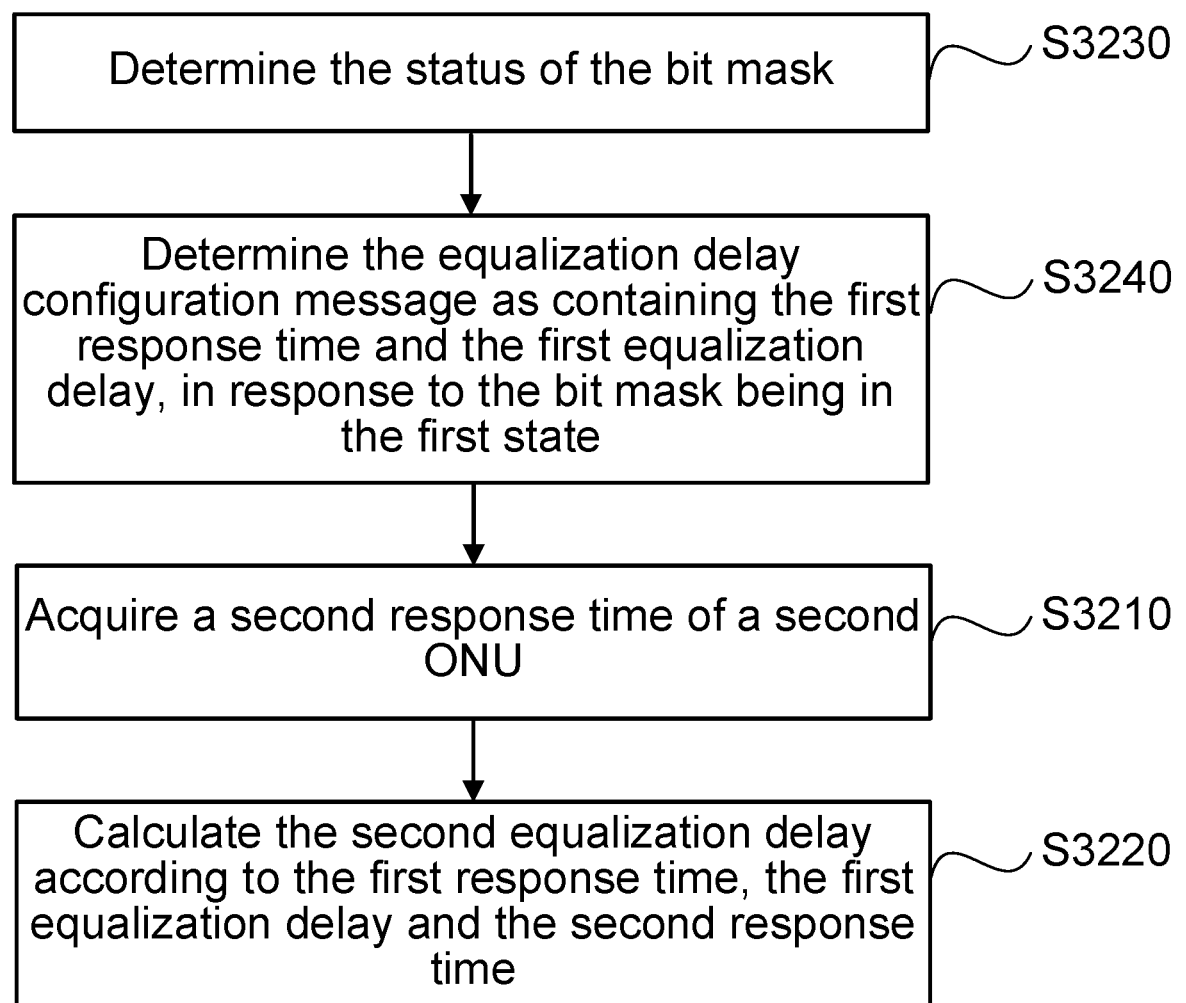

Determine the status of the bit mask ⟩~⟩ S3230

Determine the equalization delay configuration message as containing the first response time and the first equalization delay, in response to the bit mask being in the first state ⟩~⟩ S3240

Acquire a second response time of a second ONU ⟩~⟩ S3210

Calculate the second equalization delay according to the first response time, the first equalization delay and the second response time ⟩~⟩ S3220

FIG. 10

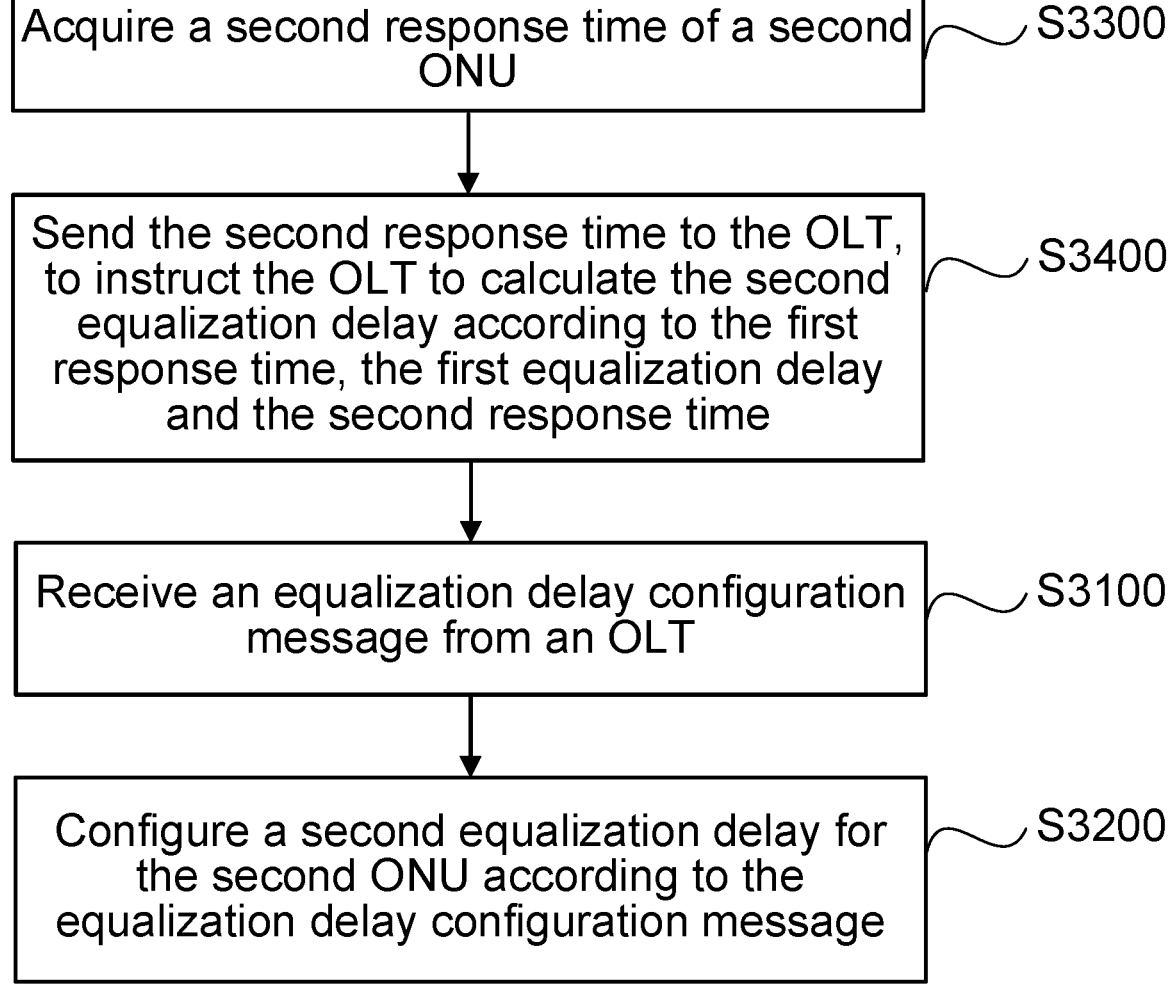

Acquire a second response time of a second ONU    S3300

Send the second response time to the OLT, to instruct the OLT to calculate the second equalization delay according to the first response time, the first equalization delay and the second response time    S3400

Receive an equalization delay configuration message from an OLT    S3100

Configure a second equalization delay for the second ONU according to the equalization delay configuration message    S3200

FIG. 11

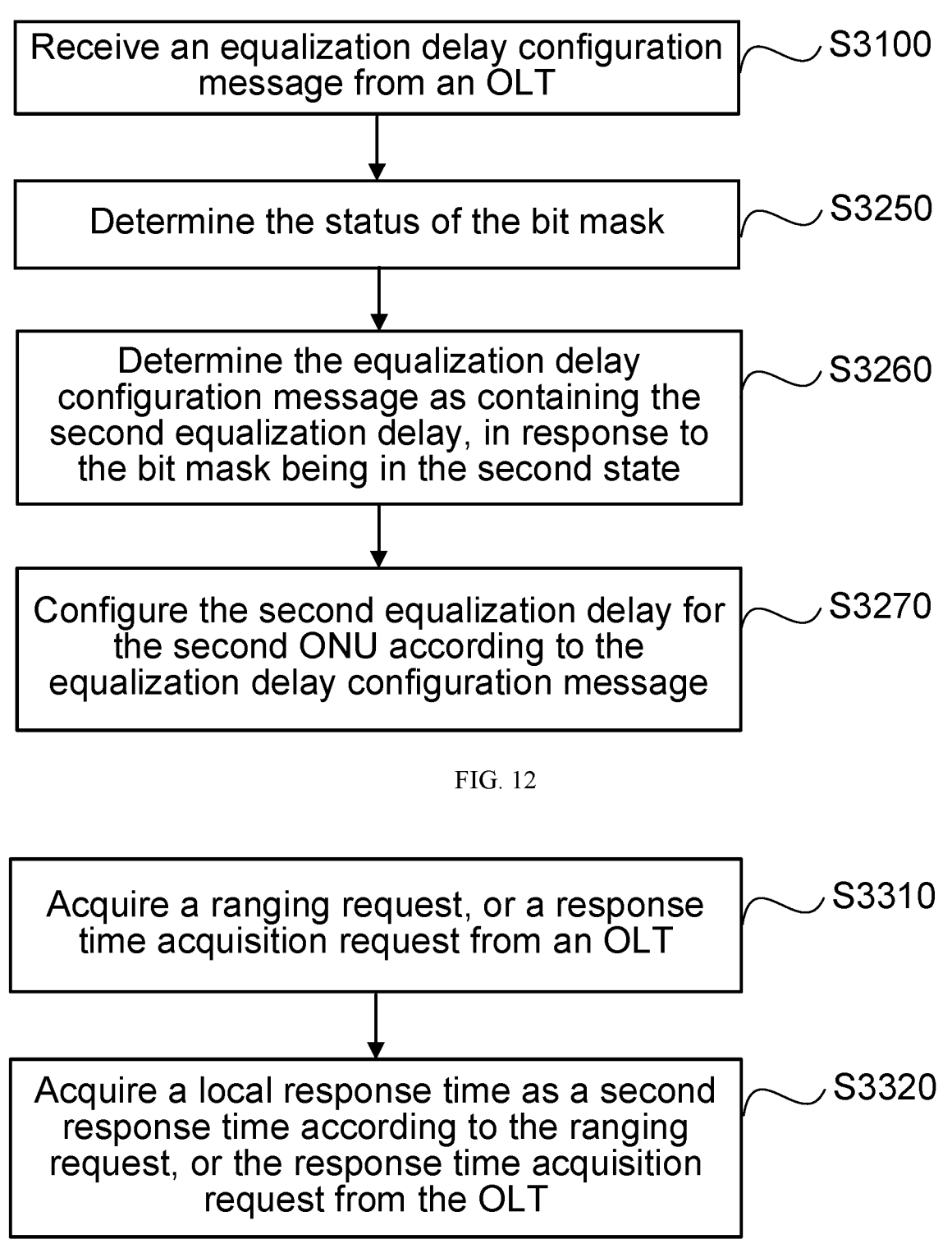

Receive an equalization delay configuration message from an OLT    S3100

Determine the status of the bit mask    S3250

Determine the equalization delay configuration message as containing the second equalization delay, in response to the bit mask being in the second state    S3260

Configure the second equalization delay for the second ONU according to the equalization delay configuration message    S3270

FIG. 12

Acquire a ranging request, or a response time acquisition request from an OLT    S3310

Acquire a local response time as a second response time according to the ranging request, or the response time acquisition request from the OLT    S3320

FIG. 13

TIME SYNCHRONIZATION METHOD FOR PASSIVE OPTICAL NETWORK, AND ELECTRONIC DEVICE AND STORAGE MEDIUM

CROSS-REFERENCE TO RELATED APPLICATIONS

This application is a national stage filing under 35 U.S.C. § 371 of international application number PCT/CN2021/136142, filed Dec. 7, 2021, which claims priority to Chinese patent application No. 202110284376.X filed Mar. 17, 2021. The contents of these applications are incorporated herein by reference in their entirety.

TECHNICAL FIELD

The present disclosure relates to the technical field of communication, in particular to a method for time synchronization in a passive optical network, an electronic apparatus, and a storage medium.

BACKGROUND

During the deployment of passive optical networks (PONs), different optical network units (ONUs) shall be compatible, so that the uplink data of each ONU would not collide. For example, in a low-delay PON system, low delay-based ranging is supported only. The non-low-delay ONUs are not possible to carry out ranging by the traditional ranging method, nor do they support the low delay-based ranging. The ranging of the non-low-delay ONU is realized with the help of a low-delay ONU or a low-delay ranging instrument. In particular, after the low-delay ONU or the low-delay ranging instrument completes the ranging on a branch optical fiber and obtains the ranging result, the non-low-delay ONU reuses the ranging result and accesses the branch optical fiber.

During time synchronization in the related schemes, OLT does not consider the local time variation parameters (such as response time) of ONUs when calculating the equalization delay (EqD). Since the local time variation parameters of different ONUs are generally different, the ranging result for one ONU is generally dedicated to that ONU. Another ONU accessing the same branch optical fiber is not possible to use the existed ranging result of the ONU, which leads to the failure in time synchronization.

SUMMARY

The following is a summary of the subject matter described herein. This summary is not intended to limit the scope of protection of the claims.

Provided are a method for time synchronization in passive optical networks, an electronic apparatus, and a storage medium in some embodiments of the present disclosure.

According to an aspect of the present disclosure, an embodiment provides a method for time synchronization in a PON, which is applied to an OLT, the method may include, acquiring a first response time from a first ONU; performing a ranging calculation to the first ONU to acquire a first equalization time delay; generating an equalization delay configuration message according to the first response time and the first equalization delay; sending the equalization delay configuration message to a second ONU to configure a second equalization delay of the second ONU; where the first ONU and the second ONU access the same branch optical fiber.

According to another aspect of the present disclosure, an embodiment provides a method for time synchronization in a PON, which is applied to a first ONU, and the method may include, sending a first response time to an OLT, to instruct the OLT to carry out the method applied to the OLT as described above.

According to yet another aspect of the present disclosure, an embodiment provides a method for time synchronization in a PON, which is applied to a second ONU, the method may include, receiving an equalization delay configuration message from an OLT; configuring a second equalization delay of the second ONU according to the equalization delay configuration message; and the second equalization delay is acquired by the OLT through the method applied to the OLT as described above.

According to yet another embodiment of the present disclosure, an embodiment provides a method for time synchronization in a PON, which may include, sending a response time configuration instruction to a second ONU to configure the response time of the second ONU, so that the response time of the second ONU matches the response time of the first ONU; and where, the first ONU and the second ONU access the same branch optical fiber.

According to yet another aspect of the present disclosure, an embodiment provides a method for time synchronization in a PON, which is applied to a second ONU, the method may include, receiving a response time configuration instruction; configuring a response time of the second ONU according to the response time configuration instruction so that the response time of the second ONU matches the response time of the first ONU; where, the first ONU and the second ONU access the same branch optical fiber.

According to yet another aspect of the present disclosure, an embodiment provides a device for time synchronization in passive optical networks, the device may include, an acquisition module, which is configured to acquire a first response time from a first ONU; a calculation module, which is configured to perform ranging calculation to the first ONU to obtain a first equalization delay; a generating module, which is configured to generate an equalization delay configuration message according to the first response time and the first equalization delay, and a sending module, which is configured to send an equalization delay configuration message to a second ONU to configure a second equalization delay for the second ONU; where, the first ONU and the second ONU access the same branch optical fiber.

According to yet another aspect of the present disclosure, an embodiment provides an electronic apparatus, which includes a memory, a processor, and a computer program stored in the memory and executable on the processor which, when executed by the processor, causes the processor to carry out any one of the methods as described above.

According to yet another aspect of the present disclosure, an embodiment provides a computer-readable storage medium storing a computer-executable instruction which, when executed by a processor causes the processor to carry out any one of the methods as described above.

BRIEF DESCRIPTION OF DRAWINGS

In order to illustrate the technical scheme in the embodiments of the present disclosure, the drawings related to the description of the embodiments or related technologies will be briefly introduced below. It is apparent that, the drawings described below are only some embodiments of the present disclosure. Those having ordinary skills in the art can derive other drawings according to these drawings without devoting creative effort.

FIG. 4 depicts a flowchart showing a method for time synchronization in a passive optical network according to an embodiment of the present disclosure;

FIG. 5 depicts a flowchart showing a method for time synchronization in a passive optical network according to another embodiment of the present disclosure;

FIG. 6 depicts a flowchart showing a method for time synchronization in a passive optical network according to another embodiment of the present disclosure;

FIG. 7 depicts a flowchart showing a method for time synchronization in a passive optical network according to another embodiment of the present disclosure;

FIG. 8 depicts a flowchart showing a method for time synchronization in a passive optical network according to another embodiment of the present disclosure;

FIG. 9 depicts a flowchart showing a method for time synchronization in a passive optical network according to another embodiment of the present disclosure;

FIG. 10 depicts a flowchart showing a method for time synchronization in a passive optical network according to another embodiment of the present disclosure;

FIG. 11 depicts a flowchart showing a method for time synchronization in a passive optical network according to another embodiment of the present disclosure;

FIG. 12 depicts a flowchart showing a method for time synchronization in a passive optical network according to another embodiment of the present disclosure;

FIG. 13 depicts a flowchart showing a method for time synchronization in a passive optical network according to another embodiment of the present disclosure;

DETAILED DESCRIPTION

Figure 1:
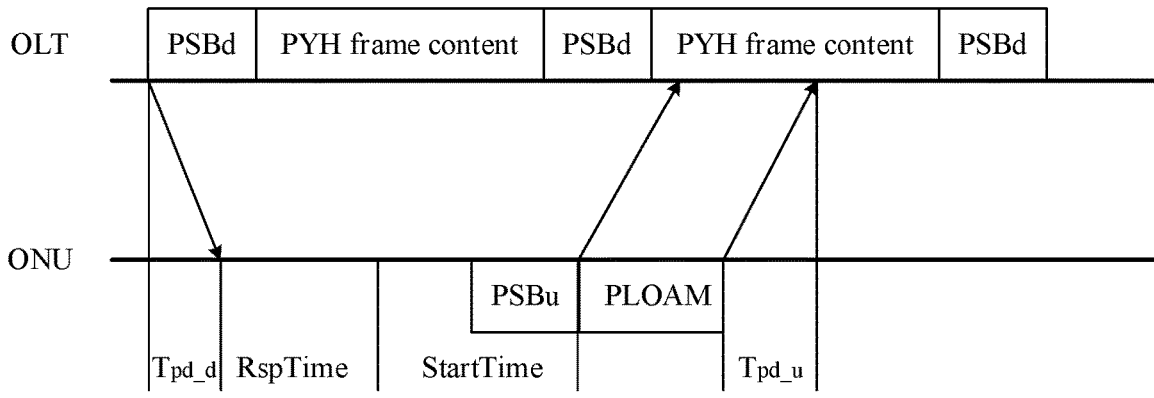
FIG. 1 depicts a schematic diagram showing the principle of ranging in a passive optical network.

In the following description, specific details, such as specific system structure and technology, are set forth for the purpose of illustration rather than limitation, for understanding of the embodiments of the present disclosure. However, it should be clear to those having ordinary skills in the art that embodiments of the present disclosure may be practiced in other embodiments that do not have these specific details. In other cases, detailed descriptions of well-known systems, devices, circuits, and methods are omitted so as not to obscure the description of the embodiments of the present disclosure with unnecessary details.

It shall be noted that, in some cases, the steps shown or described may be performed in a different order than the logical order shown in the flowcharts. It should be noted that the terms "first" and "second", if used in the description and the drawings are intended to distinguish similar objects, and do not necessarily imply any specific order or sequence.

It should also be understood that references to "one embodiment" or "some embodiments" etc. described in the description of some embodiments of the present disclosure mean that specific features, structures or characteristics described in conjunction with this embodiment are included in one or more embodiments of the present disclosure. Thus, the phrases "in one embodiment", "in some embodiments", "in other embodiments" and "in further embodiments" appearing in different places in this description do not necessarily all refer to the same embodiment, but mean "one or more but not all embodiments" unless otherwise emphasized. The terms "include", "contain", "having" and their variations all mean "including but not limited to" unless otherwise specifically emphasized.

Passive Optical Networks (PON) typically adopt a point-to-multipoint network structure, and the downlink data is broadcast. Through the Optical Distribution Network (ODN), the data can reach the Optical Network Unit (ONU), and the ONU identifies the data distributed to itself according to the ONU-ID. In the uplink direction, since one optical fiber is shared, the uplink data of ONU is transmitted via TDMA mode, and only one ONU can send data to an optical line terminal (OLT) at one single moment, otherwise it will lead to uplink data collision. In order to avoid the uplink data collision, the protocol of PON stipulates that the logical distance of all ONUs should be compensated to the same level by means of time delay compensation. Since the distance from each ONU to the OLT is different, the signal transmission time in the optical fiber is also different. Therefore, it is necessary to measure the logical distance between each ONU and the OLT in order to calculate the Equalization Delay (EqD) of each ONU, and send the corresponding delay to the ONU at the registration stage. ONU delays the uplink data based on the downlink data and according to the allocated EqD to avoid collision between the uplink data of each ONU.

During PON deployment, different ONUs shall be compatible, to avoid collision of the uplink data of each ONU. For example, in a low-delay PON system, low delay-based ranging is supported only. The non-low-delay ONUs are not possible to carry out ranging by the traditional ranging method, nor do they support the low delay-based ranging. The ranging of the non-low-delay ONU is realized with the help of a low-delay ONU or a low-delay ranging instrument. In particular, after the low-delay ONU or the low-delay ranging instrument completes the ranging on a branch optical fiber and obtains the ranging result, the non-low-delay ONU reuses the ranging result and accesses the branch optical fiber.

During time synchronization in the related schemes, OLT does not consider the local time variation parameters (such as response time) of ONUs when calculating the EqD. Since the local time variation parameters of different ONUs are generally different, the ranging result for one ONU is generally dedicated to that ONU. Another ONU accessing the same branch optical fiber is not possible to use the existing ranging result of the ONU, which leads to the failure in time synchronization. That is to say, although the response time is usually included in the calculation of EqD by OLT (the response time is typically taken as transmission delay during calculation), the EqD in practical use does not include the response time. Due to the differences in the response time of each ONU which is typically 35±1 μs, the EqD between ONUs cannot be reused.

Figure 2:
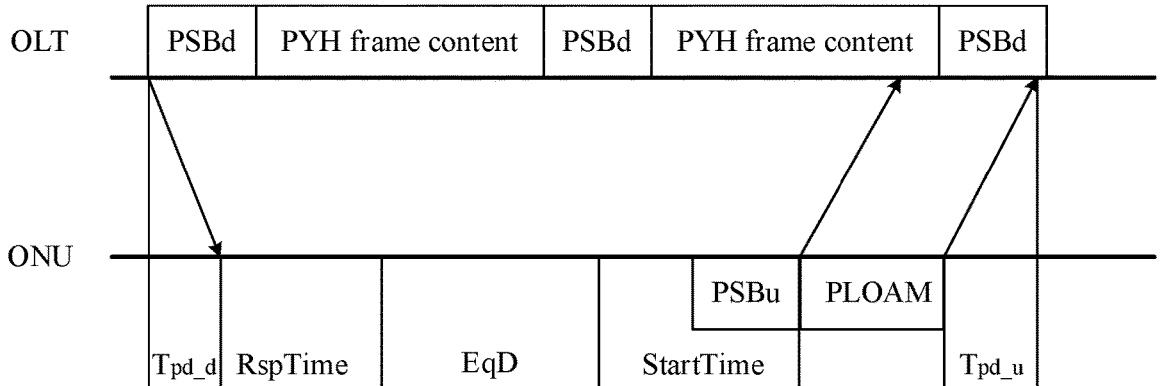
FIG. 2 depicts a schematic diagram showing the operating sequence in a passive optical network.

For example, as shown in FIGS. 1 and 2, in which FIG. 1 depicts a schematic diagram showing the principle of ranging in a passive optical network; and FIG. 2 depicts a schematic diagram showing the operating sequence in a passive optical network. In the figures, PSBu denotes an uplink physical synchronization block; PSBd denotes a downlink physical synchronization block; PHY frame content denotes the physical frame content; and PLOAM denotes Physical layer Operations, Administration and Maintenance (PLOAM) channel. In the ranging of the related schemes, a ranging request sent by an OLT arrives at an ONU after a time of transmission delay passes. RspTime (Response Time) is the response time of the ONU. StartTime specifies the time for OLT to start uploading the response, which is typically set to 0 in PON ranging. After processing the message, the ONU waits until a period of the "Start-Time" passes, then sends a response frame that undergoes an uplink transmission delay and reaches the OLT. Then the OLT calculates the Rtd (Round trip delay) of the ONU. Assuming that the uplink transmission delay and downlink transmission delay of data are $T_{pd\_u}$ and $T_{pd\_d}$ respectively, then $Rtd=T_{pd\_d}+RspTime+StartTime+T_{pd\_u}$. Since the distance between each ONU and the OLT is different, the Rtd of each ONU is different. In order to ensure the same uplink data phase, OLT calculates an EqD for each ONU, so that the sum of Rtd and EqD of each ONU is a fixed value. This value is also called the Equalized Round Trip Delay ($T_{eqd}$). $T_{eqd}$ is a value set by OLT according to the greatest optical fiber length, which is greater than or equal to the ONU with the farthest logical distance, and it is the round-trip delay for each ONU under the same PON port after delay compensation. The $T_{eqd}$ of an ONU under the same PON port satisfies: $T_{eqd}=Rtd(n)+EqD(n)$, i.e., $EqD(n)=T_{eqd}-Rtd(n)$, and the $EqD_n$ of the nth ONU can be obtained, where n=1, 2, 3 . . . . The ONU must wait until the period of EqD passes, before processing the request of OLT, which can ensure the time synchronization of all ONUs under the same PON port. During the time synchronization in the related schemes, ONU does not report the local time variation parameters (such as response time, which is 35±1 μs as specified in the standard) to OLT. These parameters are invisible to the OLT, and the response time parameters of ONUs are not taken into account during the calculation of the equalization delay by the OLT, so the ranging result for an ONU are generally dedicated to this ONU. When another ONU newly accesses the same branch optical fiber, the previous ranging result of an existing ONU may not be reused.

In view of this, some embodiments of the present disclosure provide a method for time synchronization in PONs, an electronic apparatus, and a storage medium. By configuring the equalization delay or response time for the second ONU through the OLT, the equalization delay or response time of the second ONU is matched with that of the first ONU. As such, time synchronization can be realized when different ONUs access the branch optical fiber, thereby improving the compatibility of passive optical networks.

In some embodiments, the ONU can report its own response time related to ranging to the OLT during the activation of the ONU. Alternatively, the OLT can obtain the response time of the ONU during the normal operation of the ONU, such as the local response time of the ONU. The OLT can record this information and calculate the ranging result of the ONU, and calculates the ranging result of another ONU with this information between different ONUs, so that different ONUs can flexibly access in the same branch. In other embodiments, the response time of each ONU can be set to be the same, so different ONUs can reuse EqD of other ONUs.

Some embodiments of the present disclosure will be further illustrated with reference to the drawings.

Figure 3:
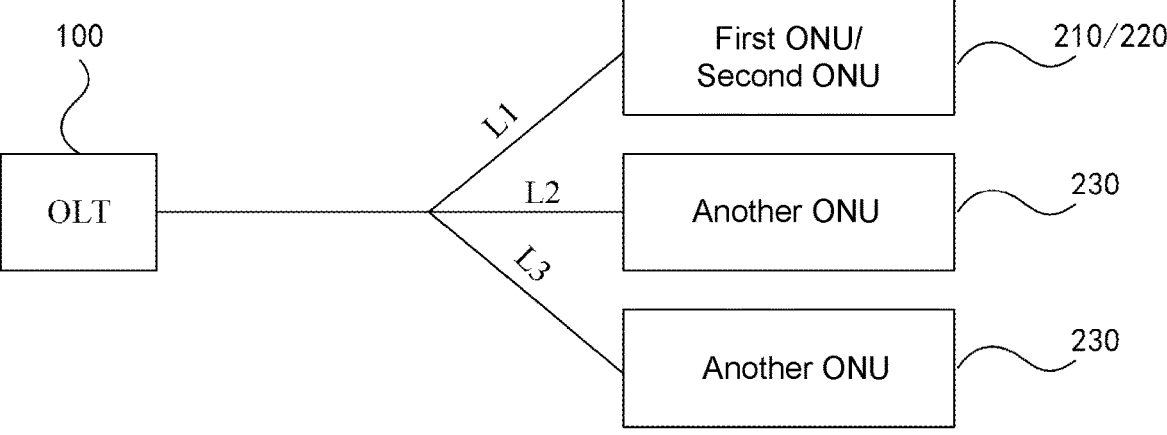
FIG. 3 depicts a schematic diagram showing a system architecture in which a method for time synchronization in a passive optical network is performed.

FIG. 3 depicts a schematic diagram showing a system architecture in which a method for time synchronization in passive optical networks according to an embodiment of the present disclosure. As shown in FIG. 3, the system architecture includes an optical line terminal (OLT) 100, a first optical network unit (ONU) 210/a second ONU 220, and another ONU 230. In some embodiments, the second ONU 220 is an ONU that accesses a passive optical network to take the place of the first ONU 210. That is, the second ONU 220 utilizes the same branch optical fiber as the first ONU 210. In some embodiments, one or both of the first ONU 210 and the second ONU 220 may be a low-delay ONU or a non-low-delay ONU.

OLT 100 is communicatively connected to each ONU through optical fibers. For example, OLT 100 is communicatively connected with the first ONU/second ONU through the first branch optical fiber L1. OLT 100 is communicatively connected with the other ONUs 230 through the second branch optical fiber L2 and the third branch optical fiber L3, respectively.

The first ONU 210/second ONU 220 is connected to a backhaul device 300 and a diagnosis and analysis system 100 through optical fibers. For example, OLT 100 is communicatively connected with the first ONU/second ONU through the first branch optical fiber L1. In some embodiments, the second ONU 220 is an ONU that accesses a passive optical network to take the place of the first ONU 210. That is, the second ONU 220 utilizes the same branch optical fiber as the first ONU 210. It should be noted that the replacement of the first optical network unit ONU 210 by the second optical network unit ONU 220 can be a direct replacement or a replacement of the MAC chip of the ONU.

The system architecture and application scenarios described in an embodiment of this application are intended for a better understanding of rather than limitations to the technical scheme of various embodiments of the present disclosure. It is known to those having ordinary skills in the art that, with the evolution of the system architecture and the emergence of new application scenarios, the technical scheme provided by the embodiment of the present disclosure is also applicable to similar technical problems.

It can be understood by those having ordinary skills in the art that the system architecture shown in FIG. 3 does not constitute a limitation to the embodiment of the present disclosure, and may include more or less components than those shown, or some components may be combined, or have different arrangements of components.

In the system architecture shown in FIG. 3, each device can call its stored programs of time synchronization in passive optical networks to perform the method for time synchronization in passive optical networks.

Based on the above system architecture, various embodiments of the method for time synchronization in passive optical networks of the present disclosure are proposed.

FIG. 4 depicts a method for time synchronization in passive optical networks, which is applied to an OLT, the method includes the following operations.

At S1100, a first response time is acquired from a first ONU.

At S1200, a ranging calculation is carried out to the first ONU to obtain a first equalization delay (EqD).

At S1300, an equalization delay configuration message is generated according to the first response time and the first EqD.

At S1400, the equalization delay configuration message is sent to the second ONU to configure the second Eqd for the second ONU.

The first ONU and the second ONU access the same branch optical fiber.

In some embodiments, S1100 may be performed in a plurality of communication processes between the OLT and ONUs. For example, in the discovery process during ONU activation, S1100 is performed to obtain the response time from the first ONU, i.e., the first response time. S1100 may also be performed in the ranging process during ONU activation to obtain the first response time from the first ONU. And S1100 may also be performed during the normal operation of the ONU to read the first response time from the first ONU. The embodiments of the present disclosure are not limited thereto.

In some embodiments, the first equalization delay obtained at S1200 can be utilized to configure the first ONU. That is, the first equalization delay is sent to the first ONU such that the first equalization delay of the first ONU is configured. For example, the OLT can configure the first equalization delay of the first ONU through the equalization delay configuration message. The equalization delay configuration message may be a ranging result message (Ranging_Time message), and the contents of the ranging result message (Ranging_Time message) are shown in Table 2 below. When the first ONU needs to be replaced, S1300 and S1400 are performed to configure the second equalization delay for the second ONU.

It should be noted that the calculation of the second equalization delay can be carried out in the OLT or in the ONU (such as the second ONU). The embodiments of the present disclosure are not limited thereto.

According to various embodiments of the present disclosure, the equalization delay of the second ONU is configured through the OLT, so that the equalization delay of the second ONU is matched with that of the first ONU, and time synchronization can be realized when different ONUs access the branch optical fiber, thereby improving the compatibility of passive optical networks.

In some embodiments, the equalization delay configuration message includes a first response time and a first equalization delay.

Accordingly, S1400 at which the equalization delay configuration message is sent to the second ONU to configure the second Eqd for the second ONU, includes the following operations.

At S1410, the equalization delay configuration message is sent to the second ONU, to instruct the second ONU to calculate the second equalization delay according to the first response time, the first equalization delay, and the second response time of the second ONU.

In some embodiments, the calculation of the second EqD can be carried out in the second ONU. The OLT sends the first response time and the first equalization delay to the second ONU, during the generation of the equalization delay configuration message. After receiving the equalization delay configuration message with the first response time, and the first equalization delay, the second ONU calculates the second equalization delay in conjunction with the local response time, i.e., the second response time. For example, the second equalization delay $EqD_2$ can be calculated by the following equation: $EqD_2 = RspTime_1 + EqD_1 - RspTime_2$, where $RspTime_1$ is the first response time, $EqD_1$ is the first equalization delay, and $RspTime_2$ is the second response time.

In some embodiments, the first response time and the first equalization delay can be combined into a single one equalization delay configuration value, and a bit mask is set to indicate whether the equalization delay configuration message contains the response time, so as to be compatible with the protocol of the equalization delay configuration message sent by the OLT in the related schemes, as detailed below.

In some embodiments, the equalization delay configuration message further includes a bit mask. The bit mask set to the first state, indicates that the equalization delay configuration message contains the first response time and the first equalization delay.

In some embodiments, a bit mask can be set in the equalization delay configuration message. The state of the bit mask indicates whether the equalization delay configuration message contains a response time. The first response time and the first equalization delay can be combined into a single one equalization delay configuration value. For example, the bit mask set to the first state, indicates that the equalization delay configuration value includes the first response time and the first equalization delay. Alternatively, the bit mask set to the second state, indicates that the equalization delay configuration value includes the equalization delay (first equalization delay or second equalization delay, not including the response time).

In some embodiments, the equalization delay configuration message contains a second equalization delay.

Accordingly, as shown in FIG. 5, S1300 at which the equalization delay configuration message is generated according to the first response time and the first EqD, includes the following operations.

At S1310, a second response time is acquired from a second ONU.

At S1320, the second equalization delay of the second ONU is calculated according to the first response time, the first equalization delay and the second response time.

At S1330, an equalization delay configuration message is generated according to the second equalization delay.

In some embodiments, the calculation of the second EqD can be carried out in the OLT. The OLT may obtain the second response time through S1310. For example, the OLT can obtain the response time of the second ONU by means of the response information, Serial_Number_ONU message (ONU serial number report message, as shown in Table 1 below) in the related schemes. Alternatively, the OLT can also obtain the second response time from the second ONU by means of the response time feedback message (Response-Time message) as shown in Table 4 below.

In some embodiments, the equalization delay configuration message further includes a bit mask. The bit mask set to the second state, indicates that the equalization delay configuration message contains the second equalization delay.

In some embodiments, a bit mask can be set in the equalization delay configuration message. The state of the bit mask indicates whether the equalization delay configuration message contains a response time. The first response time and the first equalization delay can be combined into a single one equalization delay configuration value. For example, the bit mask set to the first state, indicates that the equalization delay configuration value includes the first response time and the first equalization delay. Alternatively, the bit mask set to the second state, indicates that the equalization delay configuration value includes the equalization delay (first equalization delay or second equalization delay, not including the response time).

In some embodiments, the OLT can calculate the second equalization delay $EqD_2$ by the following equation: $EqD2 = RspTime1 + EqD1 - RspTime2$, where RspTime1 is the first response time, EqD1 is the first equalization delay and $RspTime_2$ is the second response time.

In some embodiments, as shown in FIG. 6, S1100, at which the first response time from the first ONU is acquired and stored, includes the following operations.

At S1110, one of, an SN request, a ranging request, or a response time acquisition request is sent to the first ONU.

At S1120, response information that carries the first response time, is received from the first ONU.

In some embodiments, the SN request or ranging request may be a SN request or ranging request during ONU activation in the related scheme. The response time acquisition request may be a defined response time acquisition request, as shown in Table 3 below. The response information of the first ONU can be the Serial_Number_ONU message (ONU serial number report message) in the related scheme, as shown in Table 1 below. Alternatively, the response information of the first ONU can be a response time feedback message (Response-Time message), as shown in Table 4 below.

In some embodiments, the first ONU is a low-delay ONU, the second ONU is a non-low-delay ONU. Alternatively, the first ONU is a non-low-delay ONU, the second ONU is a low-delay ONU. For example, in a low-delay PON network, the first ONU is a low-delay ONU. If the first ONU needs to be replaced by a non-low-delay second ONU, the above method can be carried out to configure the equalization delay of the second ONU to achieve compatibility. On the contrary, in a non-low delay PON network, the first ONU is a non-low delay ONU. If the first ONU needs to be replaced by a low-delay second ONU, the above method can be carried out to configure the equalization delay of the second ONU to achieve compatibility. It is apparent that, both the first ONU and the second ONU can also be a low-delay ONU or a non-low-delay ONU, and the present disclosure is not limited thereto.

According to various embodiments of the present disclosure, the equalization delay of the second ONU is configured through the OLT, so that the equalization delay of the second ONU is matched with that of the first ONU, and time synchronization can be realized when different ONUs access the branch optical fiber, thereby improving the compatibility of passive optical networks.

An embodiment of the present disclosure provides a method for time synchronization in passive optical networks, which is applied to a first ONU, the method includes the following operations.

At S2100, a first response time is sent to an OLT, to instruct the OLT to perform the method for time synchronization in passive optical networks as described above. For example, the above S1100 to S1400 described in conjunction with FIG. 4, S2311 to S2313 described in conjunction with FIG. 5, or S2321 to S2324 described in conjunction with FIG. 6 are carried out.

In some embodiments, the method for time synchronization in passive optical networks further includes the following operations.

An equalization delay configuration message is received from the OLT to configure the first ONU. That is, the first equalization delay of the first ONU is configured by the first equalization delay sent to the first ONU. The equalization delay configuration message may be a ranging result message (Ranging_Time message), and the contents of the ranging result message (Ranging_Time message) are shown in Table 2 below.

According to various embodiments of the present disclosure, the equalization delay of the second ONU is configured through the OLT, so that the equalization delay of the second ONU is matched with that of the first ONU, and time synchronization can be realized when different ONUs access the branch optical fiber, thereby improving the compatibility of passive optical networks.

In some embodiments, as shown in FIG. 7, before S2100 at which the first response time is sent to the OLT, the method further includes the following operations.

At S2200, one of, an SN request, a ranging request, or a response time acquisition request is acquired from an OLT.

At S2300, a local response time is acquired as a first response time according to one of, the SN request, the ranging request, or the response time acquisition request from the OLT.

In some embodiments, the OLT sends an SN request or a ranging request or a response time acquisition request to the first ONU by performing the above S1110. The first ONU obtains the SN request or ranging request or response time acquisition request from the OLT by performing S2200.

The SN request or ranging request may be an SN request or ranging request during ONU activation in the related scheme. The response time acquisition request may be a defined response time acquisition request, as shown in Table 3 below. The response information of the first ONU can be the Serial_Number_ONU message (ONU serial number report message) in the related scheme, as shown in Table 1 below. Alternatively, the response information of the first ONU can be a response time feedback message (Response-Time message), as shown in Table 4 below.

According to various embodiments of the present disclosure, the equalization delay of the second ONU is configured through the OLT, so that the equalization delay of the second ONU is matched with that of the first ONU, and time synchronization can be realized when different ONUs access the branch optical fiber, thereby improving the compatibility of passive optical networks.

An embodiment of the present disclosure provides a method for time synchronization in passive optical networks, which is applied to a second ONU. As shown in FIG. 8, the method includes the following operations.

At S3100, an equalization delay configuration message is received from an OLT.

At S3200, a second equalization delay is configured for the second ONU according to the equalization delay configuration message; the second equalization delay is obtained by the OLT by performing the method for time synchronization in passive optical networks as described above. For example, the second equalization delay is generated by the OLT performing the above S1100 to S1400 described in conjunction with FIG. 4, S2311 to S2313 described in conjunction with FIG. 5, or S2321 to S2324 described in conjunction with FIG. 6.

According to various embodiments of the present disclosure, the equalization delay of the second ONU is configured through the OLT, so that the equalization delay of the second ONU is matched with that of the first ONU, and time synchronization can be realized when different ONUs access the branch optical fiber, thereby improving the compatibility of passive optical networks.

In some embodiments, the equalization delay configuration message includes a first response time and a first equalization delay.

Accordingly, as shown in FIG. 9, S3200 at which the second equalization delay is configured for the second ONU according to the equalization delay configuration message, includes the following operations.

At S3210, a second response time of a second ONU is acquired.

At S3220, the second equalization delay is calculated according to the first response time, the first equalization delay and the second response time.

In some embodiments, the OLT performs the above S1410, at which an equalization delay configuration message is sent to the second ONU. Accordingly, the second ONU performs S3210 and S3220 to calculate the second equalization delay. The calculation of the second EqD can be carried out in the second ONU. The second ONU can obtain the local response time, i.e., the second response time through S3210. After receiving the equalization delay configuration message with the first response time, and the first equalization delay, the second ONU calculates the second equalization delay in conjunction with the local response time, i.e., the second response time. For example, the second equalization delay EqD2 can be calculated by the following equation: $EqD2=RspTime1+EqD1-RspTime2$, where Rsp-Time1 is the first response time, EqD1 is the first equalization delay and RspTime2 is the second response time.

In some embodiments, the equalization delay configuration message further includes a bit mask.

Accordingly, as shown in FIG. 10, S3200 at which the second equalization delay is configured for the second ONU according to the equalization delay configuration message, further includes the following operations.

At S3230, the state of the bit mask is determined.

At S3240, the equalization delay configuration message is determined as containing the first response time and the first equalization delay, in response to the bit mask being in the first state.

In some embodiments, the second ONU can identify whether the equalization delay configuration message contains the response time by the state of the bit mask. For example, the bit mask set to the first state, indicates that the equalization delay configuration value includes the first response time and the first equalization delay. Alternatively, the bit mask set to the second state, indicates that the equalization delay configuration value includes the equalization delay (first equalization delay or second equalization delay, not including the response time). In some embodiments, S3230 and S3240 precede S3210 and S3220. That is, when the bit mask is in the first state, it is determined that the equalization delay configuration message contains the first response time and the first equalization delay, and then the above S3210 and S3220 are performed to calculate the second equalization delay.

In some embodiments, the equalization delay configuration message contains a second equalization delay.

In some embodiments, as shown in FIG. 11, the method for time synchronization in passive optical networks further includes the following operations.

At S3300, a second response time of a second ONU is acquired.

At S3400, the second response time is sent to the OLT, to instruct the OLT to calculate the second equalization delay according to the first response time, the first equalization delay and the second response time.

In some embodiments, S3300 and S3400 correspond to S1310 to S1330 described above. For example, the ONU may send the second response time to the OLT by performing S3300 and S3400. Accordingly, the OLT can calculate the second equalization delay and generate an equalization delay configuration message by performing S1310 to S1330. The calculation of the second EqD can be carried out in the OLT. S3300 and S3400 precede S3100 and S3200. The second ONU may send a second response time to the OLT through S3300. For example, the second ONU can send the second response time to the OLT by means of the response information, Serial_Number_ONU message (ONU serial number report message, as shown in Table 1 below) in the related schemes. Alternatively, the second ONU can also send the second response time to the OLT by means of the response time feedback message (Response-Time message) as shown in Table 4 below.

In some embodiments, the equalization delay configuration message further includes a bit mask.

Accordingly, as shown in FIG. 12, S3200 at which the second equalization delay is configured for the second ONU according to the equalization delay configuration message, includes the following operations.

At S3250, the state of the bit mask is determined.

At S3260, the equalization delay configuration message is determined as containing the second equalization delay, in response to the bit mask being in the second state.

At S3270, the second equalization delay is configured for the second ONU according to the equalization delay configuration message.

In some embodiments, after receiving the equalization delay configuration message from the OLT at S3100, the second ONU can identify whether the equalization delay configuration message contains the response time by a state of the bit mask. For example, the bit mask set to the first state, indicates that the equalization delay configuration value includes the first response time and the first equalization delay. Alternatively, the bit mask set to the second state, indicates that the equalization delay configuration value includes the equalization delay (first equalization delay or second equalization delay, not including the response time). The equalization delay configuration message is determined as containing the second equalization delay, in response to the bit mask being in the second state, in that case, the second equalization delay can be directly employed.

In some embodiments, as shown in FIG. 13, before S3300 at which the second response time of a second ONU is acquired the method includes the following operations.

At S3310, one of, an SN request, a ranging request, or a response time acquisition request is acquired from an OLT.

At S3320, a local response time is acquired as a second response time according to the SN request, the ranging request, or the response time acquisition request from the OLT.

In some embodiments, the SN request or ranging request may be a SN request or ranging request during ONU activation in the related scheme. The response time acquisition request may be a defined response time acquisition request, as shown in Table 3 below. The response information of the second ONU can be the Serial_Number_ONU message (ONU serial number report message in the related scheme, as shown in Table 1 below. Alternatively, the response information of the second ONU can also be a response time feedback message (Response-Time message), as shown in Table 4 below.

According to various embodiments of the present disclosure, the equalization delay of the second ONU is configured through the OLT, so that the equalization delay of the second ONU is matched with that of the first ONU, and time synchronization can be realized when different ONUs access the branch optical fiber, thereby improving the compatibility of passive optical networks.

The following illustration is provided by way of three example scenarios, i.e., ONU activation process, normal operating process and restart process.

Scenario 1: acquisition of response time of ONU during activation.

During the activation, a first ONU reads the local response time (first response time) and reports the first response time to the OLT. The OLT records the first response time and ranging result (first equalization delay) of the first ONU. When the first ONU is replaced by a second ONU, the OLT sends the first equalization delay and the first response time to the second ONU. And the second ONU recalculates and applies its own second equalization delay according to the local response time (second response time). The following operations are included.

The first ONU responds to the SN request or ranging request of the OLT, and carries the first response time in the response, as shown in Table 1 below, which is the response information, Serial_Number_ONU message (ONU serial number report message), where 17th-20th bytes carry the local response time.

TABLE 1

| Octet (bytes) | Content | Description |
|---|---|---|
| 1-2 | 0x03FF | Unassigned ONU-ID. |
| 3 | 0x01 | Message type ID "Serial_Number_ONU". |
| 4 | 0x00 | Sequence number. |
| 5-8 | Vendor_ID | The code set for the Vendor_ID is specified in [ATIS-0300220]. The four characters are mapped into the 4-byte field by taking each ASCII/ANSI character code and concatenating them. Example: Vendor_ID = ABCD → Byte 5 = 0x41, Byte 6 = 0x42, Byte 7 = 0x43, Byte 8 = 0x44. |
| 9-12 | VSSN | Vendor-specific serial number. |
| 13-16 | Random_delay | The random delay used by the ONU when sending this message, measured in bit times with respect to the nominal upstream line rate of 2.48832 Gbit/s. |
| 17-20 | Response time | ONU sends the local response time to OLT. |
| 21-40 | Padding | Set to 0x00 by the transmitter; treated as "don't care" by the receiver. |
| 41-48 | MIC | Message integrity check computed using the default PLOAM integrity key (see clause 15.8). |

As shown in Table 1, bytes 1-2 are 0x03FF, which identifies the unassigned ONU-ID. Byte 3 is 0x01, which identifies the message type is "ONU serial number report message". Byte 4 is 0x00, which identifies the sequence number. Bytes 5-8 are the vendor's identifier. Bytes 9-12 are the serial number of the vendor. Bytes 13-16 identifies random delays. Bytes 17-20 identifies the response time. Bytes 21-40 are padding fields. Bytes 41-48 are check fields.

In Table 1, Bytes 17-20 of the Serial_Number_ONU message (ONU serial number report message) are originally served as Padding (padding bit), and now are modified to indicate the Response time (response time), so that the response time can be reported by the Serial_Number_ONU message (ONU serial number report message).

The OLT calculates the ranging result of the ONU, records the first response time of the first ONU, and sends the ranging result to the first ONU according to the normal flow. The equalization delay configuration message can be a ranging result message (Ranging_Time message). The content of the ranging result message (Ranging_Time message) is shown in Table 2 below, where byte 5 is the bit mask (bit R). The bit mask set to 0 (second state), indicates the equalization delay configuration value of bytes 6-9 (Equalization Delay) does not contain response time. After receiving the ranging result message (Ranging_Time message), the first ONU can directly configure its first equalization delay by the equalization delay configuration value.

If the second ONU replaces the first ONU, the second equalization delay is configured for the second ONU by Table 2. The bit R (bit mask) of byte 5 is set to 1 (first state), which indicates that the equalization delay configuration value, EqualizationDelay of bytes 6-9 is response time+ equalization delay. After receiving this message, the second ONU subtracts the local response time (second response time) from the EqualizationDelay of bytes 6-9, and the result of which is applied as the local equalization delay, EqD (the second equalization delay).

TABLE 2

| Octet (bytes) | Content | Description |
|---|---|---|
| 1-2 | ONU-ID | Directed message to one ONU or broadcast message to all ONUs. As a broadcast to all ONUs, ONU-ID = 0x03FF. |
| 3 | 0x04 | Message type ID "Ranging_Time". |
| 4 | SeqNo | Unicast or broadcast PLOAM sequence number. |
| 5 | R000 00SP | Bit mask that indicates how the EqualizationDelay field is to be interpreted. R = 0, EqualizationDelay does not include response time. R = 1, EqualizationDelay contains the response time. Bit P = 1-The delay in bytes 6-9 is absolute; ignore S. Bit P = 0-The delay in bytes 6-9 is relative; S determines sign. Bit S = 0-Positive: increase the current EqD by the specified value. Bit S = 1-Negative: decrease the current EqD by the specified value. |
| 6-9 | EqualizationDelay | Equalization delay value, bit times with respect to the nominal upstream line rate of 2.48832 Gbit/s. |
| 10-40 | Padding | Set to 0x00 by the transmitter; treated as "don't care" by the receiver. |
| 41-48 | MIC | Message integrity check. |

As shown in Table 2, bytes 1-2 identifies ONU-ID. Byte 3 is 0x04, which identifies the message type is "ranging result message (Ranging_Time message)". Byte 4 is PLOAM sequence number. Byte 5 is a bit mask (with bit R) indicating how the equalization delay field shall be interpreted. Bytes 6-9 are the equalization delay configuration values. Bytes 10-40 are padding fields. Bytes 41-48 are check fields.

In Table 2, the first bit of byte 5 in ranging result message (Ranging_Time message) is originally served as a bit mask (bit R), which is modified to identify the state of the EqualizationDelay of bytes 6-9, thus improving the compatibility of the protocol.

It should be noted that in the above embodiments, the response time of ONU may be or may not be fixed. That is, the response time of the same ONU for during each information processing can be the same or different. When the response time of ONU is not fixed, it is necessary to recalculate the local equalization delay every time.

Scenario 2: During the normal operation of ONU, OLT reads the response time of ONU.

After the activation of the first ONU is completed, the OLT can request the first response time from the first ONU through a response time acquisition request message (Request_Response-Time message) as shown in Table 3. The first ONU can send the read first response time to the OLT through a response time feedback message (Response-Time message) as shown in Table 4.

TABLE 3

| Octet (bytes) | Content | Description |
|---|---|---|
| 1-2 | ONU-ID | Directed message to one ONU. |
| 3 | 0x14 | Message type ID "Request_Response-Time". |
| 4 | SeqNo | Unicast PLOAM sequence number. |
| 5-40 | Padding | Set to 0x00 by the transmitter; treated as "don't care" by the receiver. |
| 41-48 | MIC | Message integrity check computed using the default PLOAM integrity key (see clause 15.8). |

As shown in Table 3, bytes 1-2 indicates ONU-ID. Byte 3 is 0x14, which identifiers the message type is "response time acquisition request message". Byte 4 identifiers PLOAM sequence number. Bytes 5-40 are padding fields. Bytes 41-48 are check fields.

TABLE 4

| Octet (byte) | Content | Description |
|---|---|---|
| 1-2 | ONU-ID | Sender identity |
| 3 | 0x11 | Message type ID "Response-Time". |
| 4 | SeqNo | Repeated from downstream Request_Response-Time message, or 0 if generated in response to a ranging grant in the Ranging state (O4). |
| 5-40 | Response Time | A string of 36 octets that may be useful in identifying a particular ONU installed at a particular location. The default is a string of 0x00 octets (Note). |
| 41-48 | MIC | Message integrity check computed using the default PLOAM integrity key (see clause 15.8). |

As shown in Table 4, bytes 1-2 indicate ONU-ID. Byte 3 is 0x11, which identifies the message type is "response time feedback message". Byte 4 identifiers PLOAM sequence number. Bytes 5-40 identifies the response time. Bytes 41-48 are check fields.

If it is necessary to apply the equalization delay of the first ONU to the second ONU, the equalization delay of the second ONU can be configured through the ranging result message (Ranging_Time message) as shown in Table 2. In such a case, bit R (bit mask) of byte 5 of the ranging result message is set to 1 (first state), then the equalization delay configuration value, EqualizationDelay of bytes 6-9 is the first response time+first equalization delay. After receiving this message, the non-low-delay ONU subtracts the local response time (second response time) from the EqualizationDelay of bytes 6-9, and the result of which is applied as the local equalization delay (the second equalization delay).

Scenario 3: Acquisition of the response time of ONU during restart of the second ONU.

For example, in a low-delay PON network, the first ONU is a low-delay ONU and the second ONU is a non-low-delay ONU that replaces the first ONU. For the restart of a non-low delay ONU, on the basis of scenario 2, OLT can also acquire the second response time of the non-low delay ONU through message interaction in Table 3 and Table 4. The OLT performs a local calculation to acquire the second equalization delay, i.e., the second equalization delay EaD2=RspTime1+EaD1−RspTime2, where RspTime1 is the first response time, EqD1 is the first equalization delay and RspTime2 is the second response time. The second equalization delay of the non-low-delay ONU is acquired and sent to the second ONU.

An embodiment of the present disclosure provides a method for time synchronization in passive optical networks, the method includes the following operations.

At S4100, a response time configuration instruction is sent to a second ONU to configure the response time of the second ONU, so that the response time of the second ONU matches the response time of the first ONU.

The first ONU and the second ONU access the same branch optical fiber.

In some embodiments, this method can be applied to an OLT, and can also be applied to the factory configuration equipment for ONU.

The response time of all ONUs can be set to be the same, so different ONUs can reuse the equalization delay EqD of other ONUs. For example, the second ONU can reuse the equalization delay of the first ONU.

For example, the response time of all ONU can be fixed, and ONU can obtain the response time, such as fixing the response time to the maximum value of 35+1 μs.

In some embodiments, the method set forth in the present disclosure can be applied to the factory configuration equipment for OLTs. The factory standard of ONU can be modified, and the response time can be modified to the maximum value of 35+1 μs. However, such modification is not compatible with the old fashion equipment.

In other embodiments, the method provided by some embodiments of the present disclosure can be applied to OLTs. By an additional message (response time configuration instruction), OLT can allocate the response time to ONU through this message. The response time configuration instruction can be a Set_Response-time message as shown in Table 5 below. After receiving this message, the ONU sets the local response time to the value indicated by the field of Response_time in the Set_Response-time message.

TABLE 5

| Octet (byte) | Content | Description |
|---|---|---|
| 1-2 | ONU-ID | Directed message to one ONU. |
| 3 | 0x13 | Message type ID "Set_Response-Time". |
| 4 | SeqNo | Unicast PLOAM sequence number. |
| 5-8 | Response time | The OLT assigns the response time to the ONU. |
| 9-40 | Padding | Set to 0x00 by the transmitter; treated as "don't care" by the receiver. |
| 41-48 | MIC | Message integrity check computed using the default PLOAM integrity key (see clause 15.8). |

In Table 5, bytes 1-2 indicates the ONU-ID. The third byte is 0x13, which indicates that the message type is "Response Time Configuration Instruction"; The fourth byte is PLOAM sequence number; The 5th-8th byte is the response time; Bytes 9-40 are padding fields; Bytes 41-48 are check fields.

In this way, the response time of each ONU is the same, and the EqD of different ONUs on the same branch fiber is also the same, so the second ONU can reuse the EqD of the first ONU. For example, a non-low-delay ONU can reuse the EqD of a low-delay ONU or a low-delay ranging instrument.

According to various embodiments of the present disclosure, the response time of the second ONU is configured through the OLT, so that the response time of the second ONU is matched with that of the first ONU, and time synchronization can be realized when different ONUs access the branch optical fiber, thereby improving the compatibility of passive optical networks.

Figure 14:
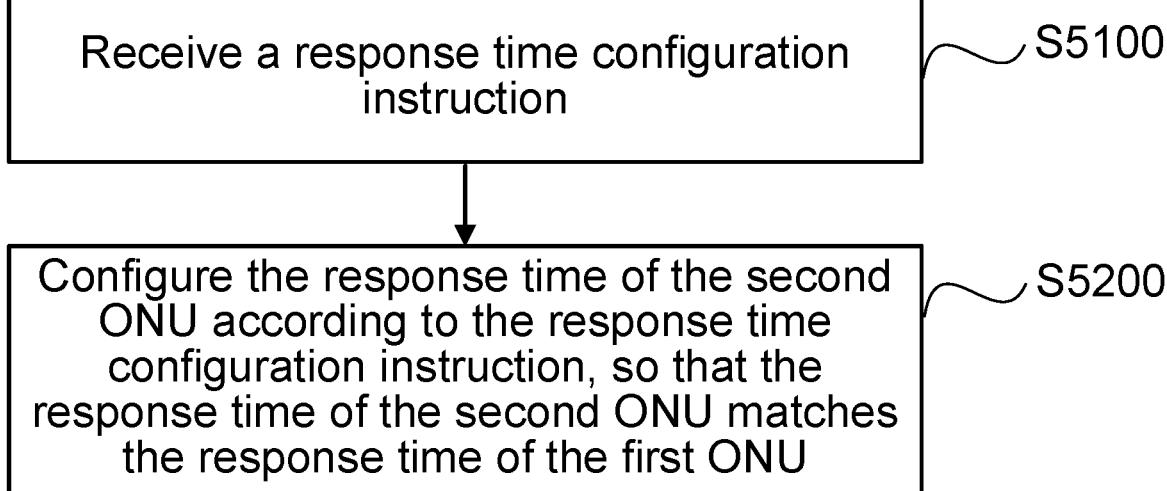
FIG. 14 depicts a flowchart showing a method for time synchronization in a passive optical network according to another embodiment of the present disclosure.

An embodiment of the present disclosure provides a method for time synchronization in passive optical networks, which is applied to a second ONU. As shown in FIG. 14, the method includes the following operations.

At S5100, a response time configuration instruction is received.

At S5200, the response time of the second ONU is configured according to the response time configuration instruction, so that the response time of the second ONU matches the response time of the first ONU.

The first ONU and the second ONU access the same branch optical fiber.

In some embodiments, the response time configuration instruction may come from the OLT, or may come from the factory configuration equipment for the ONU.

The response time of all ONUs can be set to be the same, so different ONUs can reuse the equalization delay EqD of other ONUs. For example, the second ONU can reuse the equalization delay of the first ONU.

For example, the response time of all ONU can be fixed, and ONU can obtain the response time, such as fixing the response time to the maximum value of 35+1 µs.

In some embodiments, the response time configuration instruction may come from the factory configuration equipment for the ONU. The factory standard of ONU can be modified, and the response time of ONU can be modified to the maximum value of 35+1 µs. However, such modification is not compatible with the old fashion equipment.

In other embodiments, the response time configuration instruction may come from the OLT. By an additional message (response time configuration instruction), OLT can allocate the response time to ONU through this message. The response time configuration instruction can be a Set_Response-time message as shown in Table 5 below. After receiving this message, the ONU sets the local response time to the value indicated by the field of Response_time in the Set_Response-time message.

TABLE 5

| Octet (byte) | Content | Description |
| --- | --- | --- |
| 1-2 | ONU-ID | Directed message to one ONU. |
| 3 | 0x13 | Message type ID "Set_Response-Time". |
| 4 | SeqNo | Unicast PLOAM sequence number. |
| 5-8 | Response time | The OLT assigns the response time to the ONU. |
| 9-40 | Padding | Set to 0x00 by the transmitter; treated as "don't care" by the receiver. |
| 41-48 | MIC | Message integrity check computed using the default PLOAM integrity key (see clause 15.8). |

As shown in Table 5, bytes 1-2 indicate the ONU-ID. Byte 3 is 0x13, which indicates that the message type is "Response Time Configuration Instruction". Byte 4 is the PLOAM sequence number. Bytes 5-8 indicate the response time. Bytes 9-40 are padding fields. Bytes 41-48 are check fields.

In this way, the response time of each ONU is the same, and the EqD of different ONUs on the same branch fiber is also the same, so the second ONU can reuse the EqD of the first ONU. For example, a non-low-delay ONU can reuse the EqD of a low-delay ONU or a low-delay ranging instrument.

According to various embodiments of the present disclosure, the response time of the second ONU is configured through the OLT, so that the response time of the second ONU is matched with that of the first ONU, and time synchronization can be realized when different ONUs access the branch optical fiber, thereby improving the compatibility of passive optical networks.

Figure 15:
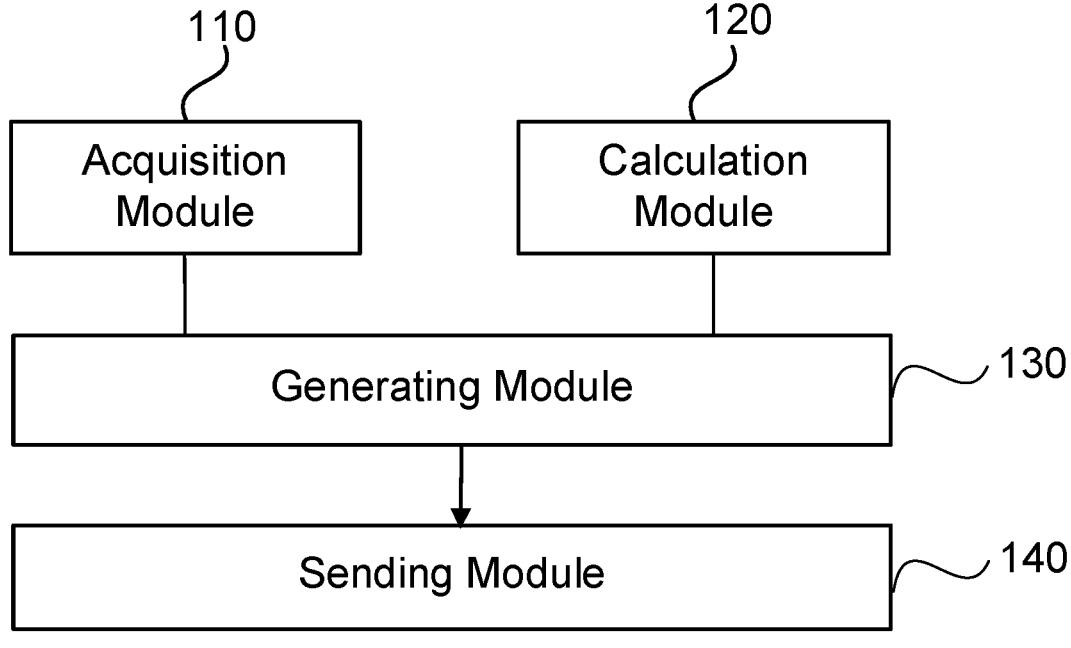
FIG. 15 depicts a schematic diagram showing a device for time synchronization in a passive optical network according to an embodiment of the present disclosure.

As shown in FIG. 15, an embodiment of the present disclosure provides a device for time synchronization in passive optical networks, the device includes the following modules.

An acquisition module 110, which is configured to acquire a first response time from a first ONU.

A calculation module 120, which is configured to perform a ranging calculation to the first ONU to obtain a first equalization delay.

A generating module 130, which is configured to generate an equalization delay configuration message according to the first response time and the first equalization delay.

A sending module 140, which is configured to send an equalization delay configuration message to a second ONU to configure a second equalization delay for the second ONU.

The first ONU and the second ONU access the same branch optical fiber.

In some embodiments, the acquisition module 110 is configured to perform the above operation S1100. The calculation module 120 is configured to perform the above operation S1200. The generating module 130 is configured to perform the above operation S1300. And the sending module 140 is configured to perform the above operation S1400. It should be noted that the device for time synchronization in passive optical networks in this embodiment can be implemented as the device for time synchronization in passive optical networks in the system architecture of the embodiment shown in FIG. 3. In addition, the device for time synchronization in passive optical networks in this embodiment can perform the method for time synchronization in passive optical networks in the embodiment shown in FIG. 4. That is, the device for time synchronization in passive optical networks in this embodiment, the device for time synchronization in passive optical networks in the system architecture of the embodiment shown in FIG. 3, and the method for time synchronization in passive optical networks in the embodiment shown in FIG. 4 all shall the same inventive concept, so these embodiments have the same implementation principle and technical effect, and which will not be described in detail here.

The above-described device embodiments are only illustrative, in which the units illustrated as separate components may or may not be physically separated, that is, they may be located in one place or distributed over several network units. Some or all of the modules can be selected according to the practical needs to achieve the purpose of this embodiment.

An embodiment of the present disclosure provides an electronic apparatus, which includes a memory, a processor, and a computer program stored in the memory and executable on the processor which, when executed by the processor, causes the processor to carry out the method as described above.

As a non-transitory computer-readable storage medium, the memory can be configured to store non-transitory software programs and non-transitory computer-executable programs. In addition, the memory may include high-speed random-access memory and non-transitory memory, such as at least one disk memory device, flash memory device, or other non-transitory solid-state memory devices. In some embodiments, the memory includes memories remotely located with respect to the processor, and these remote memories may be connected to the processor through a network. Examples of the above networks include, but are not limited to, the Internet, intranet, local area network, mobile communication network, and combinations thereof.

It should be noted that the electronic apparatus in this embodiment can be implemented as the electronic apparatus in the system architecture of the embodiment shown in FIG. 3. In addition, the electronic apparatus in this embodiment can perform the method for time synchronization in passive optical networks in the embodiment shown in FIG. 4. That is, the electronic apparatus in this embodiment, the electronic apparatus in the system architecture of the embodiment shown in FIG. 3, and the method for time synchronization in passive optical networks in the embodiment shown in FIG. 4 all shall the same inventive concept, so these embodiments have the same implementation principle and technical effect, and which will not be described in detail here.

Non-transitory software programs and instructions for the method for time synchronization in passive optical networks in any one of the above embodiments are stored in a memory which when executed by a processor, causes the processor to carry out the method for time synchronization in passive optical networks of any one of the above embodiments, for example, operations S1100 to S1400 described in conjunction with FIG. 4, S1310 to S1330 described in conjunction with FIG. 5, S1110 to S1120 described in conjunction with FIG. 6, S2200, S2300 and S2100 described in conjunction with FIG. 7, S3100 to S3200 described in conjunction with FIG. 8, S3210 to S3220 described in conjunction with FIG. 9, S3240, S3210 and S3220 described in conjunction with FIG. 10, S3300, S3400, S3100 and S3200 described in conjunction with FIG. 11, S3100, S3250, S3260 and S3270 described in conjunction with FIG. 12, S3310 to S3320 described in conjunction with FIG. 13, S5100 to S5200 described in conjunction with FIG. 14.

An embodiment of the present disclosure provides a computer-readable storage medium storing a computer-executable instruction which when executed by a processor, causes the processor to carry out the method for time synchronization in a passive optical network as described above.

In some embodiment, the computer-readable medium stores a computer-executable program which, when executed by a processor or a controller (such as a processor in the diagnosis and analysis system 100), causes the processor or controller to carry out the method for time synchronization in passive optical networks of any one of the above embodiments, for example, operations S1100 to S1400 described in conjunction with FIG. 4, S1310 to S1330 described in conjunction with FIG. 5, S1110 to S1120 described in conjunction with FIG. 6, S2200, S2300 and S2100 described in conjunction with FIG. 7, S3100 to S3200 described in conjunction with FIG. 8, S3210 to S3220 described in conjunction with FIG. 9, S3240, S3210 and S3220 described in conjunction with FIG. 10, S3300, S3400, S3100 and S3200 described in conjunction with FIG. 11, S3100, S3250, S3260 and S3270 described in conjunction with FIG. 12, S3310 to S3320 described in conjunction with FIG. 13, S5100 to S5200 described in conjunction with FIG. 14.

An embodiment of the present disclosure provides a method for time synchronization in a PON, which is applied to an OLT, the method includes, acquiring a first response time from a first ONU; performing ranging calculation to the first ONU to acquire a first equalization time delay; generating an equalization delay configuration message according to the first response time and the first equalization delay; sending the equalization delay configuration message to a second ONU to configure a second equalization delay of the second ONU; where, the first ONU and the second ONU access the same branch optical fiber. According to various embodiments of the present disclosure, the equalization delay or response time of the second ONU is configured through the OLT, so that the equalization delay or response time of the second ONU is matched with that of the first ONU, and time synchronization can be realized when different ONUs access the branch optical fiber, thereby improving the compatibility of passive optical networks.

It shall be appreciated by a person having ordinary skills in the art that all or some of the steps and systems disclosed above can be implemented as software, firmware, hardware and their appropriate combinations. Some or all physical components can be implemented as software executed by a processor, such as a central processing unit, a digital signal processor or a microprocessor, or as hardware, or as an integrated circuit, such as an application specific integrated circuit. Such software can be distributed on computer-readable media, which can include computer storage media (or non-transitory media) and communication media (or transitory media). As is well known to a person having ordinary skills in the art, the term computer storage medium includes volatile and nonvolatile, removable and non-removable medium implemented in any method or technology for storing information such as computer readable instructions, data structures, program modules or other data. Computer storage medium includes, but is not limited to, RAM, ROM, EEPROM, flash memory or other memory technologies, CD-ROM, digital versatile disks (DVD) or other optical disk storage, magnetic boxes, tapes, magnetic disk storage or other magnetic storage devices, or any other medium that can be used to store desired information and accessible by a computer. Furthermore, it is well known to those having ordinary skills in the art that communication media usually contains computer-readable instructions, data structures, program modules or other data in modulated data signals such as carrier waves or other transmission mechanisms, and can include any information delivery media.

The above is a description of some embodiments of the present disclosure, but the embodiments of the present disclosure are not limited to the above-mentioned embodiments, and those having ordinary skills in the art can make various equivalent modifications or alternations without departing from the scope of the present disclosure, those equivalent modifications or alternations fall within the scope defined by the claims of the present disclosure.

What is claimed is:

1. A method for time synchronization in a passive optical network (PON), which is applied to an optical line terminal (OLT), the method comprising,
    acquiring a first response time from a first optical network unit (ONU);
    performing a ranging calculation to the first ONU to acquire a first equalization time delay;
    generating an equalization delay configuration message according to the first response time and the first equalization delay; and
    sending the equalization delay configuration message to a second ONU to configure a second equalization delay for the second ONU;
    wherein, the first ONU and the second ONU access a same branch optical fiber;
        wherein the equalization delay configuration message comprises the first response time and the first equalization delay; and
        accordingly, sending the equalization delay configuration message to the second ONU to configure the second equalization delay for the second ONU comprises,
        sending the equalization delay configuration message to the second ONU, to instruct the second ONU to calculate the second equalization delay according to the first response time, the first equalization delay, and a second response time of the second ONU.

2. The method as claimed in claim 1, wherein the equalization delay configuration message further comprises a bit mask; and the bit mask set to a first state indicates an inclusion of both the first response time and the first equalization delay within the equalization delay configuration message.

3. A method for time synchronization in a passive optical network (PON), which is applied to an optical line terminal (OLT), the method comprising, acquiring a first response time from a first optical network unit (ONU);

performing a ranging calculation to the first ONU to acquire a first equalization time delay;

generating an equalization delay configuration message according to the first response time and the first equalization delay; and sending the equalization delay configuration message to a second ONU to configure a second equalization delay for the second ONU;

wherein, the first ONU and the second ONU access a same branch optical fiber;

wherein the equalization delay configuration message comprises the second equalization delay; and accordingly, generating the equalization delay configuration message according to the first response time and the first equalization delay comprises, acquiring a second response time from the second ONU;

calculating a second equalization delay for the second ONU according to the first response time, the first equalization delay, and the second response time; and generating the equalization delay configuration message according to the second equalization delay.

4. The method as claimed in claim 3, wherein the equalization delay configuration message further comprises a bit mask; and the bit mask set to a second state indicates an inclusion of the second equalization delay within the equalization delay configuration message.

5. The method as claimed in claim 1, wherein, acquiring and recording the first response time from the first ONU comprises, sending one of, an SN request, a ranging request, or a response time acquisition request to the first ONU; and receiving response information that carries the first response time from the first ONU.

6. A method for time synchronization in a passive optical network (PON), which is applied to a first optical network unit (ONU), the method comprising, sending a first response time to an optical line terminal (OLT), to instruct the OLT to perform the method as claimed in claim 1.

7. The method as claimed in claim 6, wherein before sending the first response time to the OLT, the method further comprises, acquiring one of, an SN request, a ranging request, or a response time acquisition request from the OLT; and acquiring a local response time as a first response time according to one of, the SN request, the ranging request, or the response time acquisition request from the OLT.

8. A method for time synchronization in a passive optical network (PON), which is applied to a second optical network unit (ONU), the method comprising, receiving an equalization delay configuration message from an optical line terminal (OLT); and configuring a second equalization delay for the second ONU according to the equalization delay configuration message;

wherein, the second equalization delay is acquired by the OLT through performing the method as claimed in claim 1.

9. The method as claimed in claim 8, wherein the equalization delay configuration message comprises the first response time and the first equalization delay; and accordingly, configuring the second equalization delay for the second ONU according to the equalization delay configuration message comprises, acquiring a second response time of the second ONU; and calculating the second equalization delay according to the first response time, the first equalization delay, and the second response time.

10. The method as claimed in claim 9, wherein the equalization delay configuration message further comprises a bit mask; and accordingly, configuring the second equalization delay for the second ONU according to the equalization delay configuration message further comprises, determining a state of the bit mask; and determining an inclusion of both the first response time and the first equalization delay within the equalization delay configuration message, in response to a determination that the bit mask is in a first state.

11. The method as claimed in claim 10, wherein the equalization delay configuration message comprises the second equalization delay; and the method further comprises, acquiring a second response time of the second ONU; and sending the second response time to the OLT, to instruct the OLT to calculate the second equalization delay according to the first response time, the first equalization delay, and the second response time.

12. The method as claimed in claim 11, wherein the equalization delay configuration message further comprises a bit mask; and accordingly, configuring the second equalization delay for the second ONU according to the equalization delay configuration message comprises, determining a state of the bit mask;

determining an inclusion of the second equalization delay within the equalization delay configuration message, in response to a determination that the bit mask is in a second state; and configuring a second equalization delay for the second ONU according to the equalization delay configuration message.

13. The method as claimed in claim 11, wherein acquiring the second response time of the second ONU comprises, acquiring one of, an SN request, a ranging request, or a response time acquisition request from the OLT; and acquiring a local response time as a second response time according to one of, the SN request, the ranging request, or the response time acquisition request from the OLT.

14. A method for time synchronization in a passive optical network (PON), comprising, sending the equalization delay configuration message according to claim 1, to the second optical network unit (ONU) to configure the second response time of the second ONU, so that the second response time of the second ONU matches the first response time of the first ONU; and wherein, the first ONU and the second ONU access the same branch optical fiber.

15. A method for time synchronization in a passive optical network (PON), which is applied to a second optical network unit (ONU), the method comprising, receiving the equalization delay configuration message according to claim 1; and configuring the second response time of the second ONU according to the response time configuration instruction so that the second response time of the second ONU matches the first response time of the first ONU; wherein, the first ONU and the second ONU access the same branch optical fiber.

16. An electronic apparatus, comprising a memory, a processor, and a computer program stored in the memory and executable by the processor which, when executed by the processor causes the processor to carry out the method as claimed in claim 1.

17. A non-transitory computer-readable storage medium storing a computer-executable instruction which when executed by a processor, causes the processor to carry out the method as claimed in claim 1.

18. An electronic apparatus, comprising a memory, a processor, and a computer program stored in the memory and executable by the processor which, when executed by the processor causes the processor to carry out the method as claimed in claim 3.

19. A non-transitory computer-readable storage medium storing a computer-executable instruction which when executed by a processor, causes the processor to carry out the method as claimed in claim 3.

* * * * *